(12) United States Patent
Pyo et al.

(10) Patent No.: US 12,222,767 B2
(45) Date of Patent: Feb. 11, 2025

(54) DISPLAY DEVICE

(71) Applicant: LG ELECTRONICS INC., Seoul (KR)

(72) Inventors: Jonggil Pyo, Seoul (KR); Jaehun Lee, Seoul (KR); Chulki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 202 days.

(21) Appl. No.: 17/936,355

(22) Filed: Sep. 28, 2022

(65) Prior Publication Data

US 2023/0111967 A1 Apr. 13, 2023

(30) Foreign Application Priority Data

Sep. 29, 2021 (KR) .................... 10-2021-0128830

(51) Int. Cl.
*G06F 1/16* (2006.01)
(52) U.S. Cl.
CPC .......... *G06F 1/1656* (2013.01); *G06F 1/1624* (2013.01); *G06F 1/1652* (2013.01)
(58) Field of Classification Search
CPC .... G06F 1/1656; G06F 1/1624; G06F 1/1652; G06F 1/1601; G09F 9/301
See application file for complete search history.

(56) References Cited

U.S. PATENT DOCUMENTS

| | | | | |
|---|---|---|---|---|
| 7,542,286 B2* | 6/2009 | Kang | .................... | G06F 1/1601 361/690 |
| 7,956,524 B2* | 6/2011 | Yamamoto | .............. | H01J 29/86 313/493 |
| 9,119,298 B2* | 8/2015 | Park | ...................... | G06F 1/1601 |
| 9,510,440 B2* | 11/2016 | Nam | ...................... | G06F 1/1652 |
| 10,290,240 B2* | 5/2019 | Kang | ..................... | H10K 50/84 |
| 10,484,642 B2* | 11/2019 | Park | ..................... | G09G 3/3216 |
| 11,013,130 B2* | 5/2021 | Shin | .................. | G02F 1/133305 |

(Continued)

FOREIGN PATENT DOCUMENTS

KR 10-2014-0117182 10/2014

OTHER PUBLICATIONS

Korean Intellectual Property Office Application No. 10-2021-0128830, Office Action dated May 19, 2023, 5 pages.

(Continued)

*Primary Examiner* — Rockshana D Chowdhury
(74) *Attorney, Agent, or Firm* — LEE, HONG, DEGERMAN, KANG & WAIMEY

(57) ABSTRACT

A display device includes: a flexible display panel; a flexible rear plate behind the display panel, and coupled to the display panel; a flexible inner plate coupled to the rear plate, between the rear plate and the display panel; a driving module coupled behind the rear plate, and provided with a slider that linearly reciprocates; a wing elongated to have one end coupled to the slider and another end coupled behind the rear plate, and provided with a pivot shaft positioned adjacent to the one end, between the ends; and a wing bracket adjacent to the pivot shaft to be fixed behind the rear plate, and coupled to the pivot shaft. The inner plate is positioned between the ends of the wing, and includes a plurality of holes formed by punching the inner plate and arranged in a direction intersecting with a length direction of the wing.

15 Claims, 22 Drawing Sheets

(56) References Cited

U.S. PATENT DOCUMENTS

| | | | |
|---|---|---|---|
| 11,229,127 B2* | 1/2022 | Hwang | G06F 1/1652 |
| 11,579,658 B2* | 2/2023 | Kim | G06F 1/1626 |
| 11,659,672 B2* | 5/2023 | Cho | G09G 3/035 |
| | | | 361/807 |
| 2015/0043136 A1 | 2/2015 | Kim et al. | |
| 2015/0145837 A1* | 5/2015 | Park | H04N 21/41265 |
| | | | 345/184 |
| 2016/0127674 A1* | 5/2016 | Kim | H04N 21/42204 |
| | | | 348/739 |
| 2017/0188470 A1* | 6/2017 | Cho | G09F 9/301 |
| 2017/0347466 A1 | 11/2017 | Kang et al. | |
| 2019/0198783 A1* | 6/2019 | Kim | H01L 27/156 |
| 2023/0111967 A1* | 4/2023 | Pyo | G09F 9/301 |
| | | | 361/679.01 |
| 2024/0147813 A1* | 5/2024 | Pyo | G09F 9/301 |

OTHER PUBLICATIONS

European Patent Office Application Serial No. 22197916.4, Search Report dated Mar. 6, 2023, 11 pages.

* cited by examiner

DISPLAY DEVICE

CROSS-REFERENCE TO RELATED APPLICATION

Pursuant to 35 U.S.C. § 119, this application claims the benefit of earlier filing date and right of priority to Korean Application No. 10-2021-0128830, filed on Sep. 29, 2021, the contents of which are all incorporated by reference herein in its entirety

BACKGROUND OF THE INVENTION

1. Field of the Invention

The present disclosure relates to a display device. More particularly, the present disclosure relates to a display device capable of changing the curvature of a display panel.

2. Description of the Related Art

As the information society develops, the demand for display device is also increasing in various forms. In response to this, various display devices such as Liquid Crystal Display Device (LCD), Electroluminescent Display (ELD), Vacuum Fluorescent Display (VFD), Organic Light Emitting Diode (OLED), and the like have been researched and used in recent years.

Among them, an OLED panel can display an image by depositing an organic material layer capable of emitting light by itself on a substrate on which a transparent electrode is formed. The OLED panel may have a flexible characteristic as well as a thin thickness. A lot of researches have been accomplished on a structural characteristic of a display device having such an OLED panel.

SUMMARY OF THE INVENTION

The present disclosure has been made in view of the above problems, and provides a structure which can freely change the curvature of a display panel.

The present disclosure further provides a mechanism which can freely change the curvature of a display.

In accordance with an aspect of the present disclosure, a display device includes: a flexible display panel; a flexible rear plate which is positioned in a rear of the display panel, and coupled to the display panel; a flexible inner plate which is coupled to the rear plate, between the rear plate and the display panel; a driving module which is coupled to a rear of the rear plate, and provided with a slider that linearly reciprocates; a wing which is elongated to have one end coupled to the slider and have the other end coupled to the rear of the rear plate, and is provided with a pivot shaft positioned adjacent to the one end, between the one end and the other end; and a wing bracket which is adjacent to the pivot shaft to be fixed to the rear of the rear plate, and is coupled to the pivot shaft, wherein the inner plate which is positioned between the one end and the other end of the wing, and comprises a plurality of holes formed by punching the inner plate, wherein the plurality of holes is arranged in a direction intersecting with a length direction of the wing.

According to at least one embodiment of the present disclosure, it is possible to provide a structure which can freely change the curvature of the display panel.

According to at least one embodiment of the present disclosure, it is possible to provide a mechanism which can freely change the curvature of the display.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Figure 1:
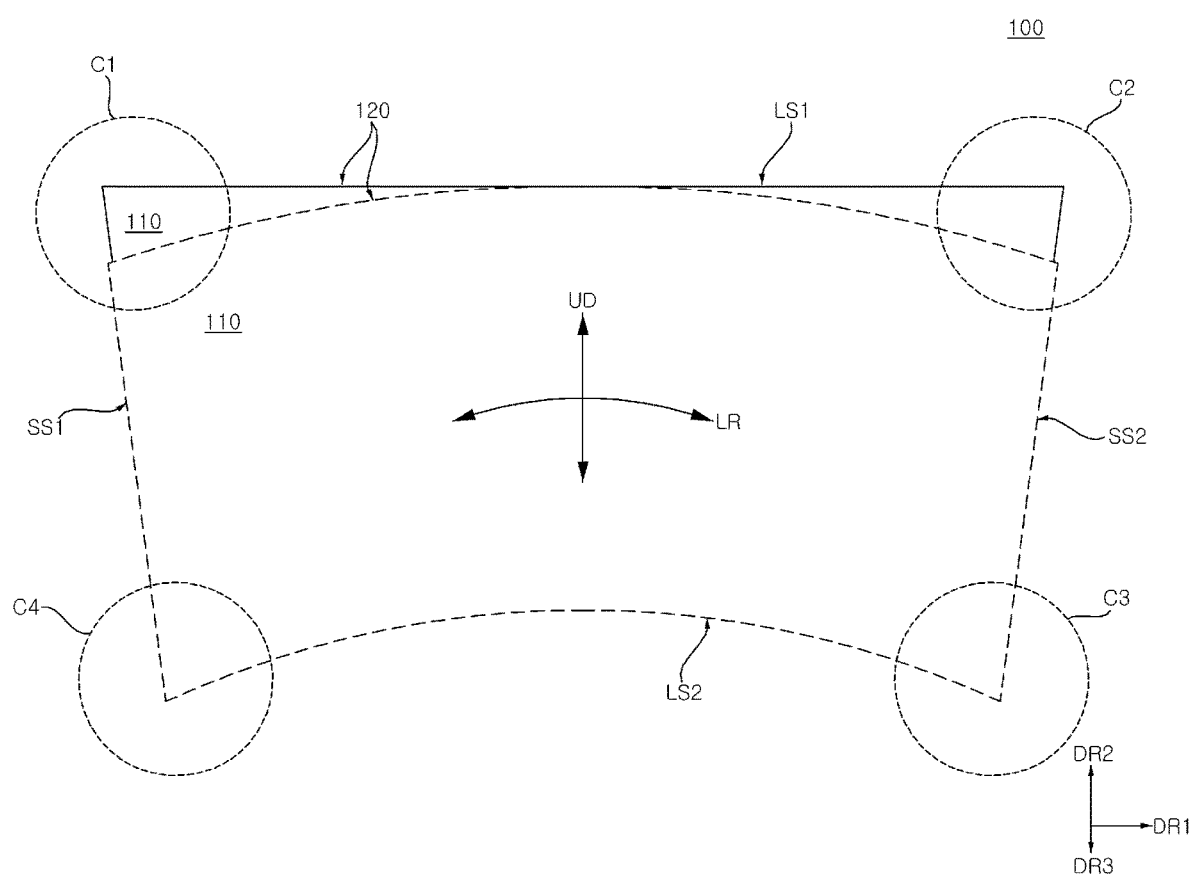
FIGS. 1 to 22 are diagrams illustrating examples of a display device according to embodiments of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "module" and "unit" are used or combined with each other only in consideration of ease in the preparation of the specification, and do not have or serve as different meanings. In addition, in describing the embodiments disclosed in the present specification, if it is determined that detailed descriptions of related well-known technologies may obscure the gist of the embodiments disclosed in the present specification, the detailed description thereof will be omitted. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

Although the terms "first," "second," etc., may be used herein to describe various components, these components should not be limited by these terms. These terms are only used to distinguish one component from another component.

When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

Hereinafter, an organic light emitting diode (OLED) will be described as an example for a display panel, but the display panel applicable to the present disclosure is not limited to the OLED panel.

In addition, hereinafter, the display device may include a first long side LS1, a second long side LS2 opposite to the first long side LS1, a first short side SS1 adjacent to one ends of the first long side LS1 and the second long side LS2, and a second short side SS2 opposite to the first short side SS1.

Here, the first short side area SS1 can be referred to as a first side area, the second short side area SS2 can be referred to as a second side area opposite to the first side area, the first long side area LS1 can be referred to as a third side area that is adjacent to the first side area and the second side area and positioned between the first side area and the second side area, and the second long side area LS2 can be referred to as a fourth side area that is adjacent to the first side area and the second side area, positioned between the first side area and the second side area, and opposite to the third side area.

In addition, for convenience of explanation, the lengths of the first and second long sides LS1 and LS2 are illustrated and described as being longer than the lengths of the first and second short sides SS1 and SS2, but the lengths of the first and second long sides LS1 and LS2 can be approximately equal to the lengths of the first and second short sides SS1 and SS2.

In addition, hereinafter, a first direction DR1 may be a direction parallel to the long side LS1, LS2 of the display device, and a second direction DR2 may be a direction parallel to the short side SS1, SS2 of the display device. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

The side on which the display device displays an image may be referred to as a front or a front surface. When the display device displays an image, the side from which the image cannot be observed may be referred to as a rear or a rear side. When the display is viewed from the front or the front surface, the side of the first long side LS1 may be referred to as an upper side or an upper surface. Similarly, the side of the second long side LS2 may be referred to as a lower side or a lower surface. Similarly, the side of the first short side SS1 may be referred to as a left side or a left surface, and the side of the second short side SS2 may be referred to as a right side or a right surface.

In addition, the first long side LS1, the second long side LS2, the first short side SS1, and the second short side SS2 may be referred to as edge of the display device. Further, a point where the first long side LS1, the second long side LS2, the first short side SS1, and the second short side SS2 meet each other may be referred to as a corner. For example, a point where the first long side LS1 and the first short side SS1 meet may be a first corner C1, a point where the first long side LS1 and the second short side SS2 meet may be a second corner C2, a point where the second short side SS2 and the second long side LS2 meet may be a third corner C3, and a point where the second long side LS2 and the first short side SS1 meet may be a fourth corner C4.

Here, a direction from the first short side SS1 toward the second short side SS2 or a direction from the second short side SS2 toward the first short side SS1 may be referred to as a left-right direction LR. A direction from the first long side LS1 toward the second long side LS2 or from the second long side LS2 toward the first long side LS1 may be referred to as an up-down direction UD.

Referring to FIG. 1, a plate 120 may be flexible. For example, the plate 120 may be a metal plate. The plate 120 may be referred to as a flexible plate 120, a frame 120, a module cover 120, or a rear plate 120. The display panel 110 may be positioned in a front or in a front surface of the plate 120. The display panel 110 may be flexible. For example, the display panel 110 may be an OLED panel.

The display panel 110 is provided on the front surface of the display device 100 and can display an image. The display panel 110 may divide an image into a plurality of pixels and output an image by matching color, brightness, and saturation for each pixel. The display panel 110 may generate light corresponding to a color of red, green, or blue according to a control signal.

The display device 100 may have a variable curvature. In the display device 100, left and right sides of the display device 100 may move forward. For example, in a state where an image is viewed from the front of the display device 100, the display device 100 may be curved concavely. In this case, the plate 120 may be bent at the same curvature as the display panel 110. Alternatively, the display panel 110 may be bent to correspond to the curvature of the plate 120.

Figure 2:
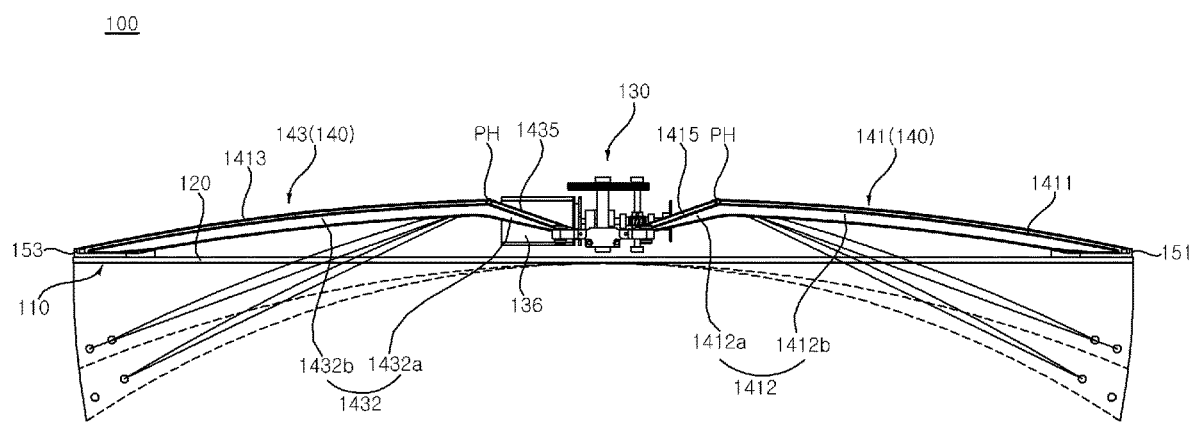
Figure 3:
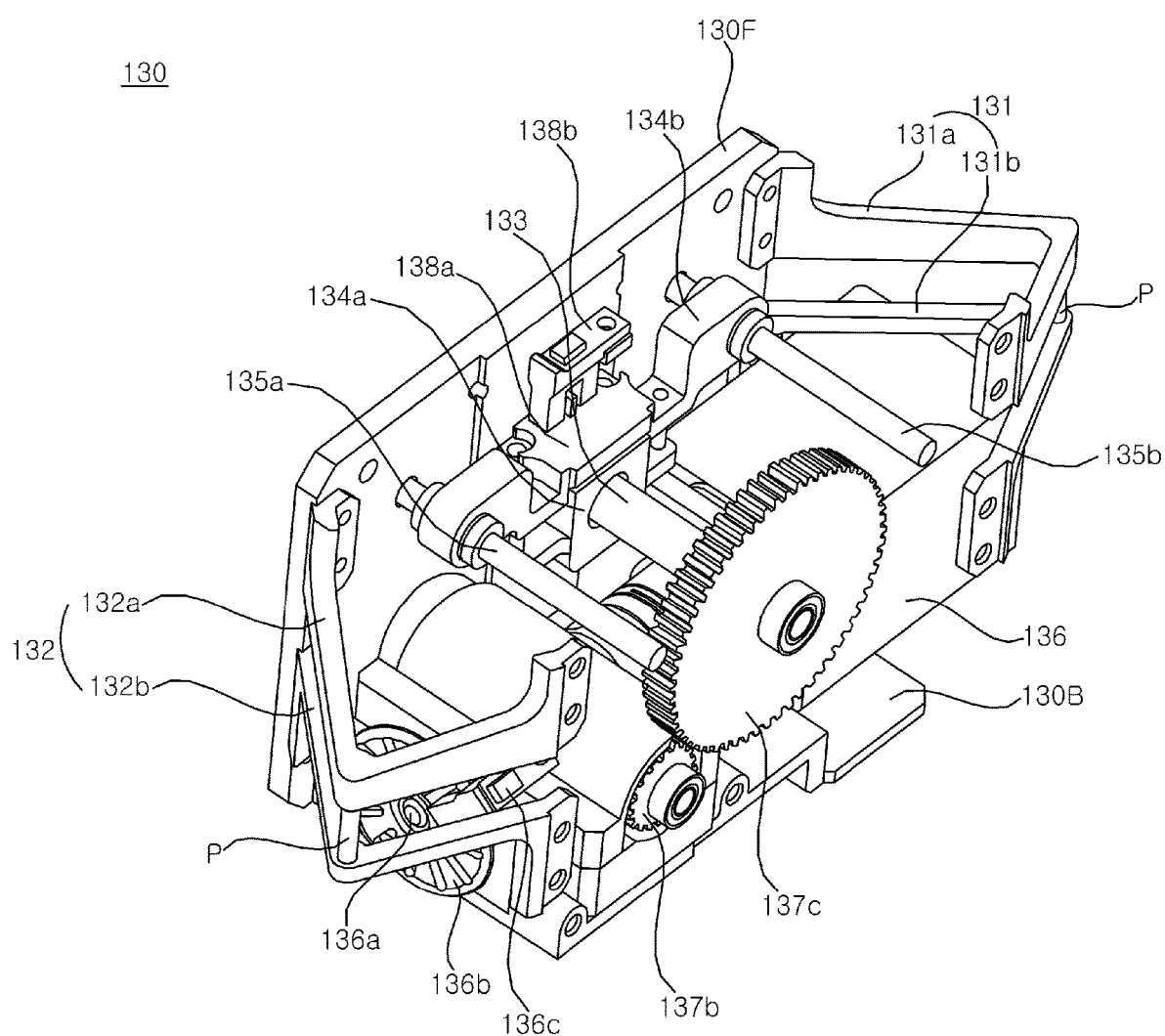

Referring to FIGS. 2 and 3, the plate 120 may be coupled to the rear of the display panel 110. The plate 120 may support the rear of the display panel 110. The plate 120 may have a shape corresponding to the display panel 110.

A driving module 130 may be coupled to the rear of the plate 120. The driving module 130 may include a front bracket 130F, a base 130B, and wing brackets 131 and 132.

The front bracket 130F may be coupled to or fixed to the rear or rear surface of the plate 120. The front bracket 130F may have a flat plate shape having a rectangular shape. The base 130B may be coupled to or fixed to the front bracket 130F, and may form the bottom of the driving module 130.

The wing bracket 131, 132 may be plural. A plurality of wing brackets 131 and 132 may include a first wing bracket 131 and a second wing bracket 132. The first wing bracket 131 may be coupled or fixed to the front bracket 130F, and may face the second wing bracket 132. The second wing bracket 132 may also be coupled or fixed to the front bracket 130F.

The wing bracket 131, 132 may be V-shaped. The wing bracket 131, 132 may be a pair of brackets 131 and 132. In the wing bracket 131, 132, an upper bracket 131a, 132a and a lower bracket 131b and 132b may be positioned side by side. A pin P may be positioned between the upper bracket 131a, 132a and the lower bracket 131b, 132b. The vertices of the upper bracket 131a, 132a and the lower bracket 131b, 132b may be connected.

A first wing 143 may be rotatably coupled to the first wing bracket 131, and a second wing 141 may be rotatably coupled to the second wing bracket 132. The first wing 143 may be line-symmetric with the second wing 141 with respect to the driving unit 130.

Figure 4:
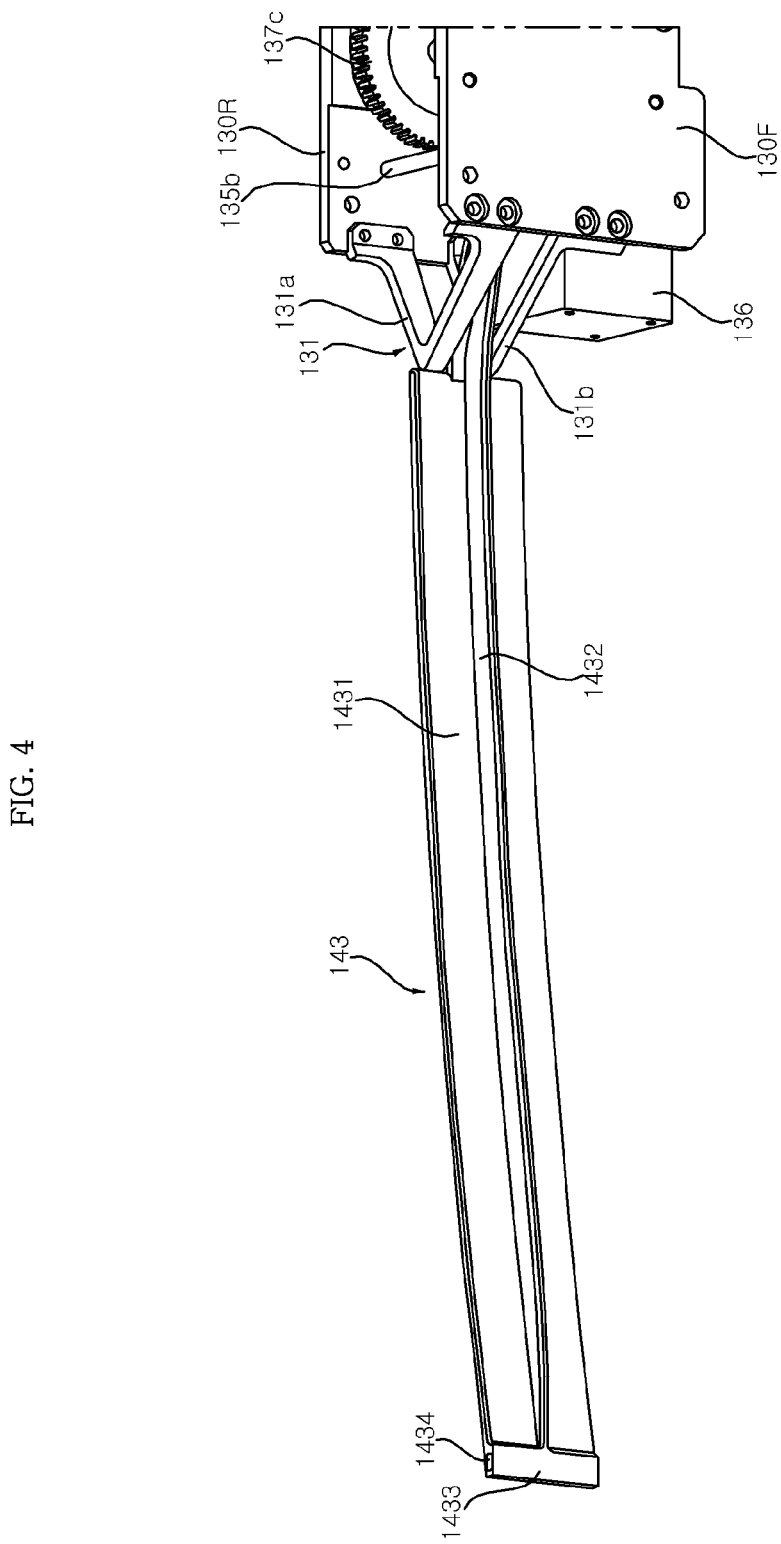
Figure 5:
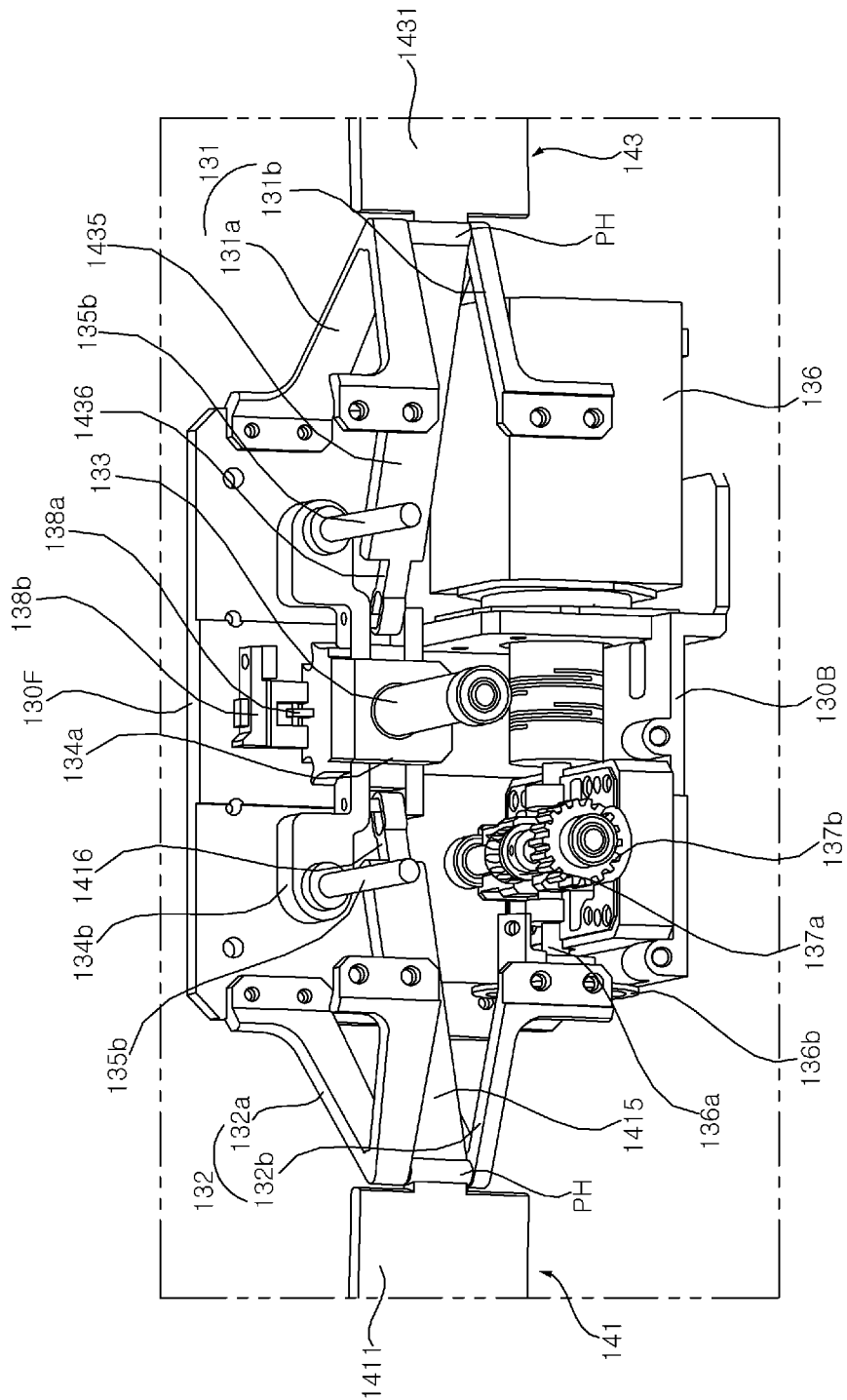

Referring to FIGS. 4 and 5, the first wing 143 may be pivotally connected to the first wing bracket 131. Descriptions of the first wing 143 and the first wing bracket 131 may be applied to the second wing 141 and the second wing bracket 132. The first wing 143 may include a wing plate 1431, a rib 1432, a wing end 1433, a pivot shaft PH, and a lever 1435.

The wing plate 1431 may be an elongated plate. The lever 1435 may extend from one end of the wing plate 1431. The lever 1435 may be an elongated plate. The length of the lever 1435 may be smaller than the length of the wing plate 1431, and the width of the lever 1435 may be smaller than the width of the wing plate 1431. The thickness of the wing plate 1431 may be substantially the same as the thickness of the lever 1435.

Referring to FIG. 2 together, a rib 1412, 1432 may be elongated in the length direction of a wing plate 1411, 1431 and the lever 1415, 1435, and may be formed on one surface of the wing plate 1411, 1431 and the lever 1415, 1435. The rib 1412, 1432 may intersect with the width direction of the wing plate 1411, 1431 and the lever 1415, 1435. The wing plate 1411, 1431 may be gently curved, and the lever 1415, 1435 may be connected to the wing plate 1411, 1431 while being bent. The rib 1412, 1432 may include a first rib 1412a, 1432a and a second rib 1412b, 1432b. The width of the first rib 1412a, 1432a may be gradually narrowed away from the pivot shaft PH. The width of the second rib 1412b, 1432b may be substantially the same as the width of the first rib 1412a, 1432a adjacent to the pivot shaft PH.

In FIG. 5, the pivot shaft PH of the wing 141, 143 may be pivotally connected to the pin P of the wing bracket 131, 132. The pin P may be inserted into the pivot shaft PH of the wing 141, 143. The wing 141, 143 may rotate or pivot on the wing bracket 131, 132 around the pin P. The thickness of the pivot shaft PH may be greater than the thickness of the wing plate 1411, 1431 and/or the lever 1415, 1435. Accordingly, the structural rigidity of the wing 140 according to the driving may be improved.

Figure 6:
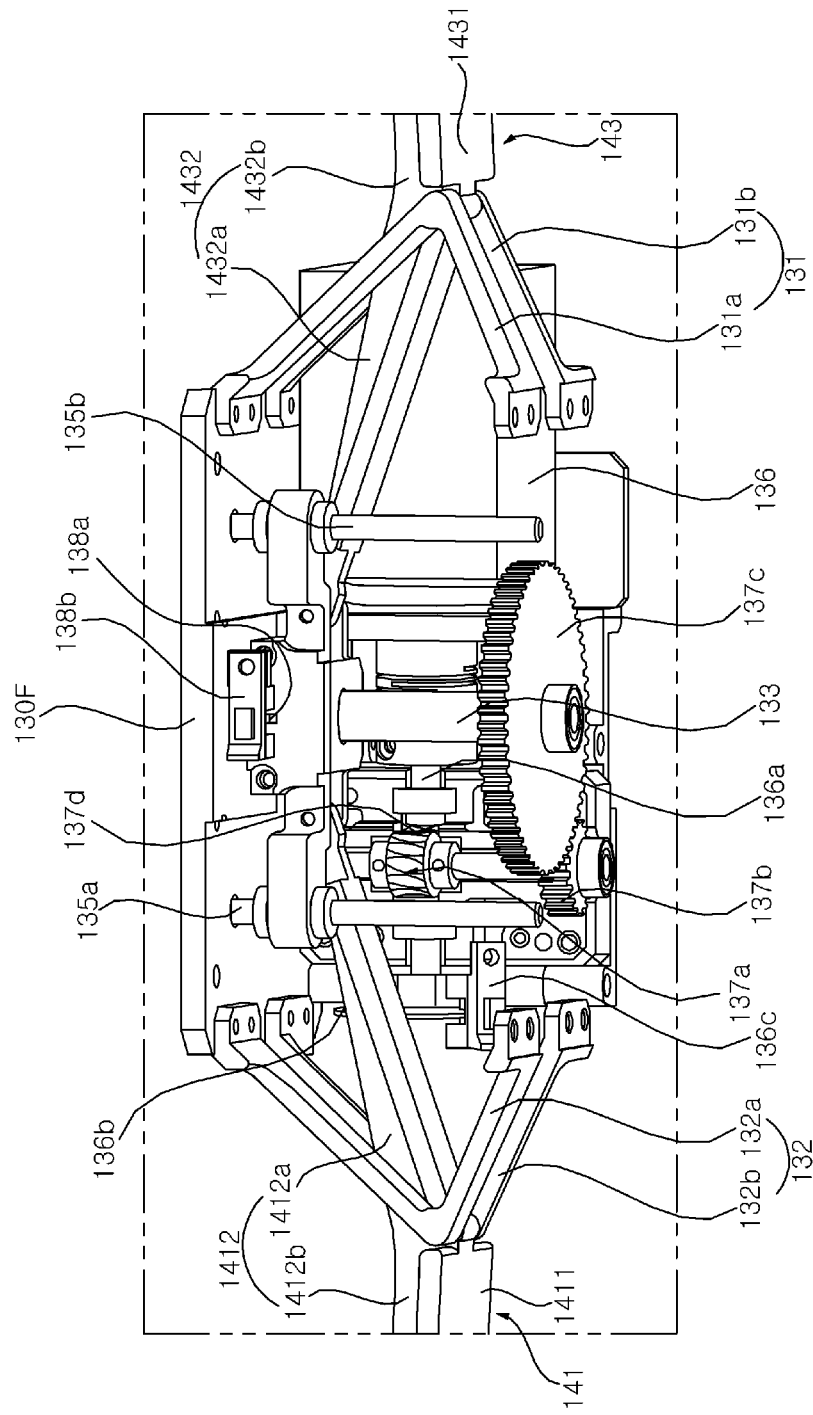

Referring to FIGS. 5 and 6, a lead screw 133 may be rotatably installed in the front bracket 130F. For example, the lead screw 133 may be elongated, and may have a thread on its outer surface. The lead screw 133 may be inserted into a slider 134a. The slider 134a may be thread-coupled to the lead screw 133. When the lead screw 133 rotates, the slider 134a may reciprocate in the length direction of the lead screw 133.

A slider guide 134b may be fixed on the slider 134a. The slider guide 134b may move together with the slider 134a. A guide shaft 135a, 135b may be coupled or fixed to the front bracket 130F. The guide shaft 135a, 135b may be parallel to the lead screw 134b. The guide shaft 135a, 135b may include a first guide shaft 135a and a second guide shaft 135b. A first guide shaft 135a may face the second guide shaft 135b with respect to the lead screw 133. The guide shaft 135a, 135b may be inserted into the slider guide 134b. Accordingly, the slider 134a may stably reciprocate in the length direction of the lead screw 133 according to the rotation of the lead screw 133.

The motor 136 may be installed on the base 130B. A rotation shaft 136a of the motor 136 may intersect with the length direction of the lead screw 133. The motor 136 and the rotation shaft 136a of the motor 136 may be disposed between the lead screw 133 and the base 130B. A worm 137d may be fixed to the rotation shaft 136a of the motor 136 and may rotate together with the rotation shaft 136a of the motor 136. A worm gear 137a may mesh with the worm 137d. A transmission gear 137b may rotate coaxially with the worm gear 137a. A driving gear 137c may be fixed to one end of the lead screw 133 and rotate together with the lead screw 133. The driving gear 137c may mesh with the transmission gear 137b. The diameter of the driving gear 137c may be larger than the diameter of the transmission gear 137b.

A disk indicator 136b may be fixed adjacent to the end of the rotation shaft 136a of the motor 136. A sensor 136c may be fixed to the base 130B or the wing bracket 132 while being adjacent to the disk indicator 136b. Accordingly, the number of rotations and/or the amount of rotation of the motor 136 may be detected. A pin indicator 138a may be fixed on the slider 134a or the slider guide 134b. A sensor 138b may be fixed to the front bracket 130F, and may detect the approach of the pin indicator 138a. Accordingly, a start point and/or a terminal point of the slider 134a may be detected.

Figure 7:
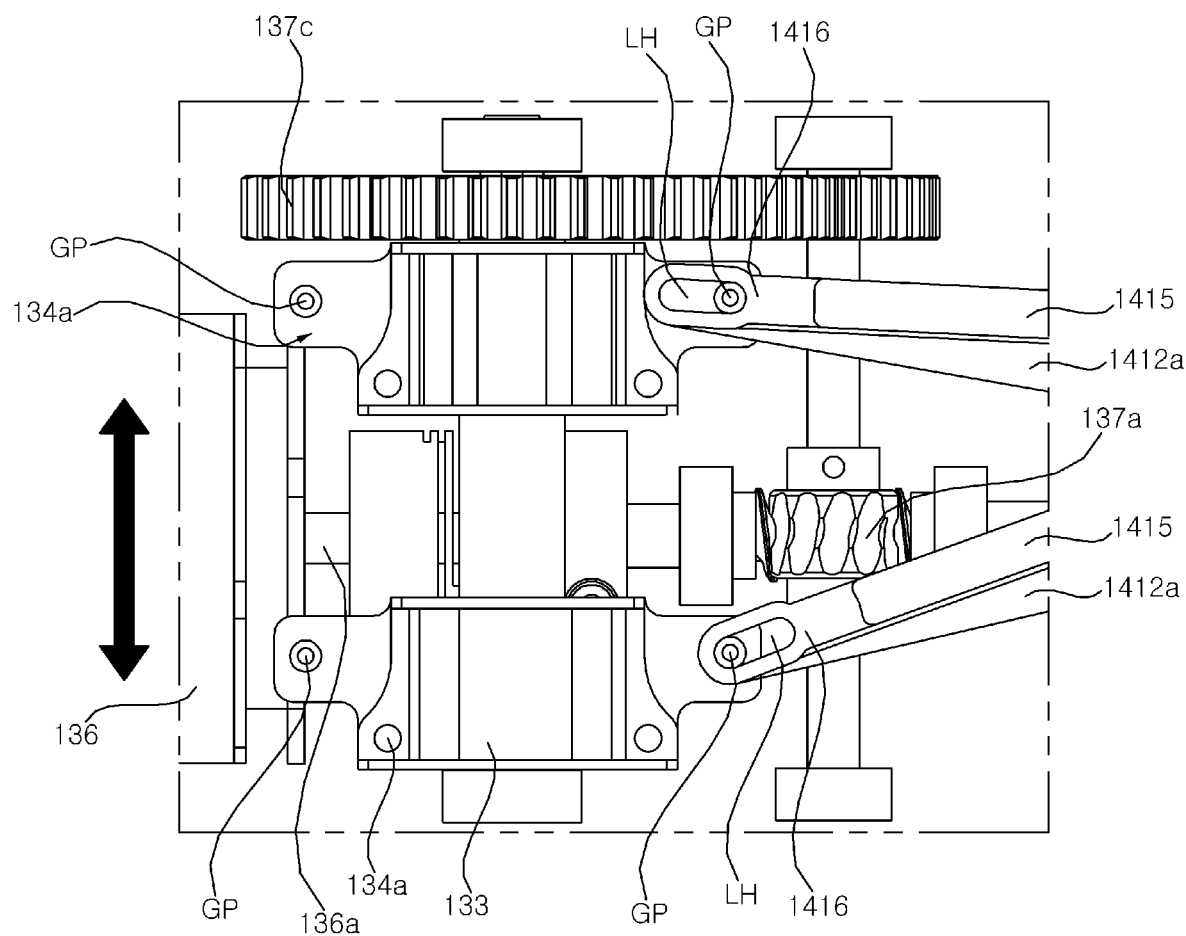
Figure 8:
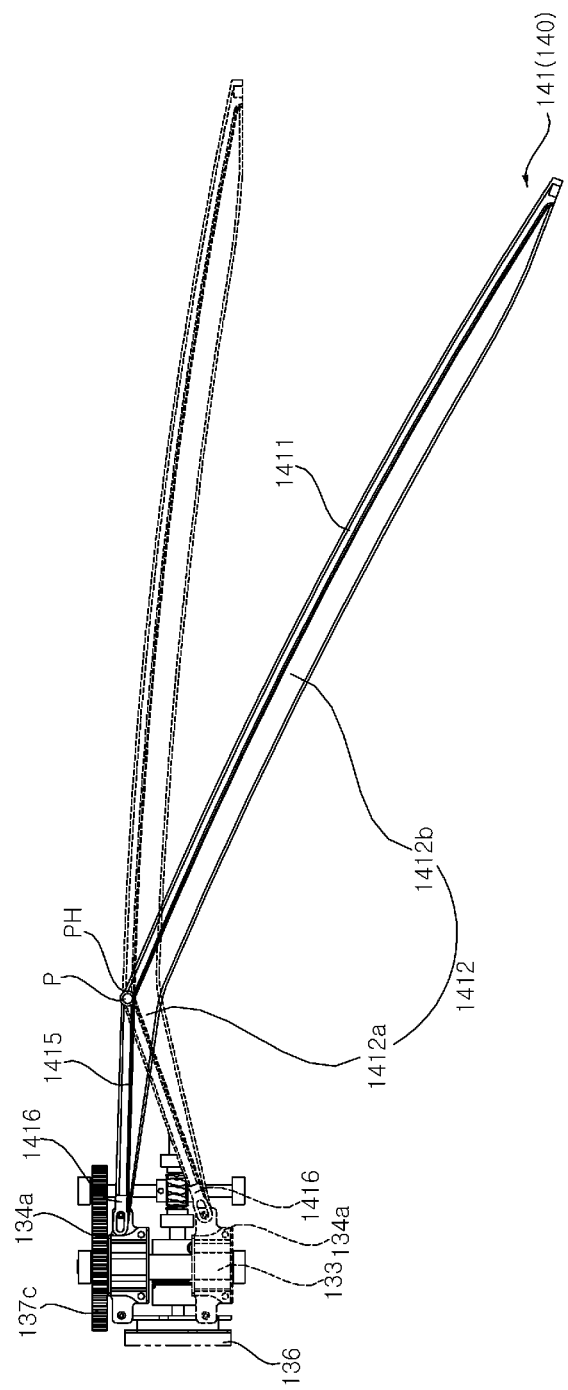

Referring to FIGS. 7 and 8, the wing 141 may include a connecting rod 1416. The connecting rod 1416 may be fixed to or extend from the lever 1415. The connecting rod 1416 may be connected to the slider 134a. The connecting rod 1416 may be pivotally connected to the slider 134a. The connecting rod 1416 may have a long hole LH. The long hole LH may be formed in the end of the connecting rod 1416 adjacent to the slider 134a. The slider 134a may include a connection pin GP. The connection pin GP may have a cylindrical shape. The diameter of the connection pin GP may be substantially the same as the width of the long hole LH.

As the lead screw 133 rotates, the slider 134a may reciprocate in the length direction of the lead screw 133. The lever 1415 connected to the slider 134a by the connecting rod 1416 may move together with the slider 134a, and the wing 141 may pivot about the pivot shaft PH. At this time, the connection pin GP may move inside the long hole LH.

Figure 9:
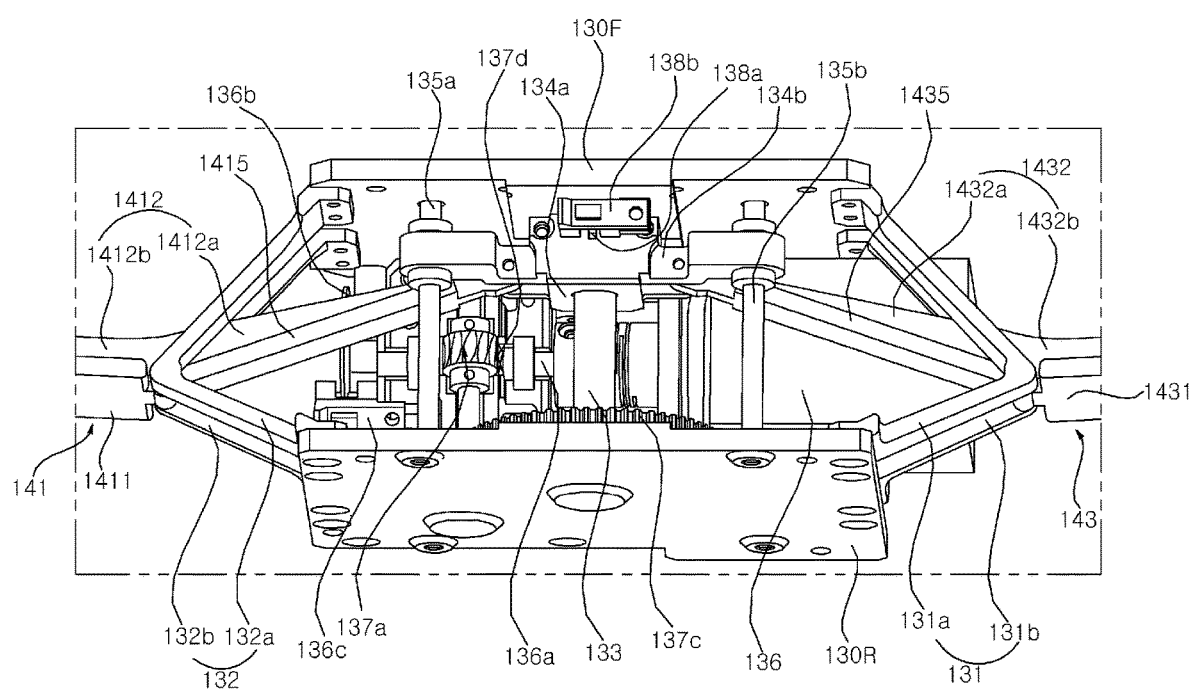

Referring to FIG. 9, a rear bracket 130R may be coupled to the wing bracket 131, 132. The rear bracket 130R may face the front bracket 130F. The lead screw 133 may connect the front bracket 130F and the rear bracket 130R.

The guide shaft 135a, 135b may be coupled to the front bracket 130F and the rear bracket 130R. The length of the lead screw 133 and/or the length of the guide shaft 135a, 135b may correspond to a distance between the front bracket 130F and the rear bracket 130R.

The wing brackets 131 and 132 may be coupled to the front bracket 130F and the rear bracket 130R. One end of the wing bracket 131, 132 may be coupled or fixed to the front bracket 130F, and the other end of the wing bracket 131, 132 may be coupled or fixed to the rear bracket 130R.

Figure 10:
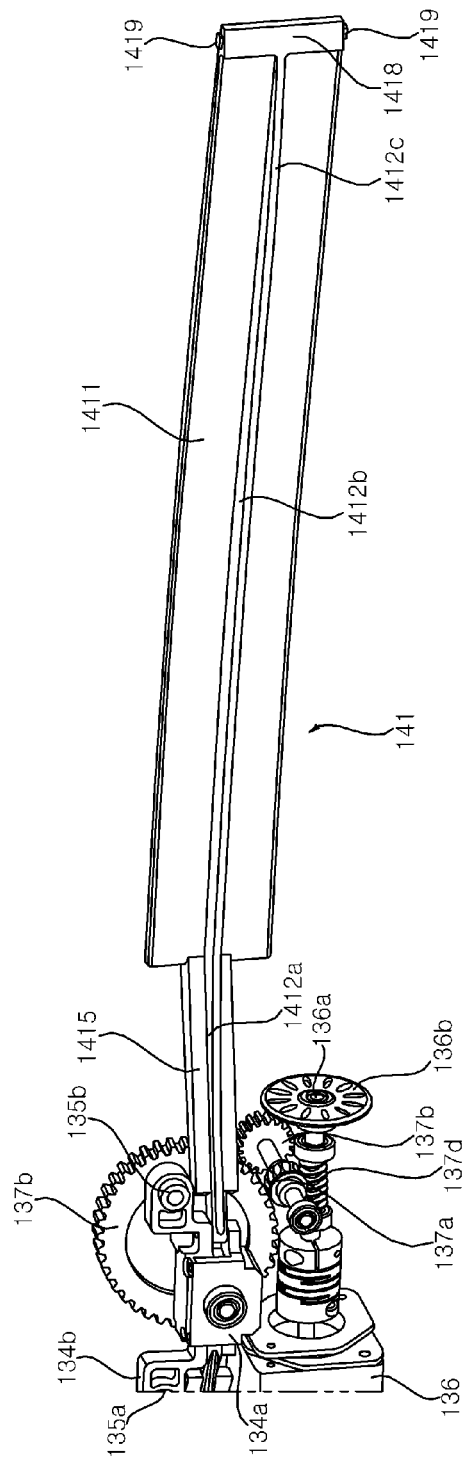
Figure 11:
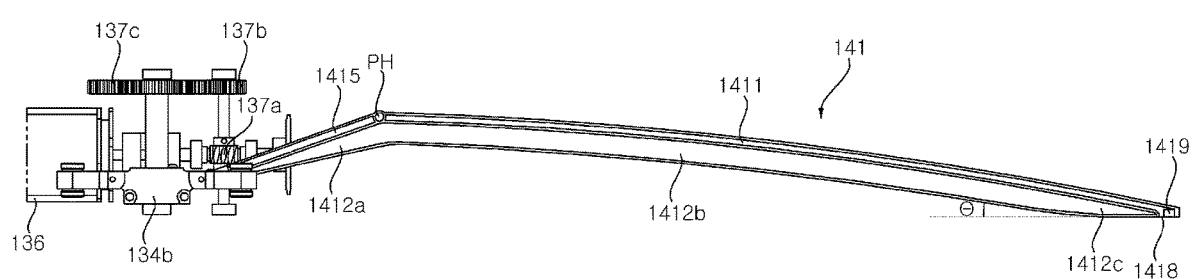

Referring to FIGS. 10 and 11, the wing 141 may include a wing end 1418 and an end rib 1412c. The wing end 1418 may form the distal end of the wing plate 1411. The thickness of the wing end 1418 may be greater than the thickness of the wing plate 1411.

The end rib 1412c may be referred to as a third rib 1412c. The third rib 1412c may connect the wing end 1418 from the second rib 1412b. The third rib 1412c may extend in the length direction of the second rib 1412b and may be formed in the wing plate 1411.

The length direction of the third rib 1412c may form a certain angle with respect to the length direction of the second rib 1412b. For example, the length direction of the second rib 1412b may form an obtuse angle with respect to the length direction of the third rib 1412c.

An end pin 1419 may be formed in the wing end 1418. The end pin 1419 may be formed to protrude from one end surface and/or the other end surface of the wing end 1418.

Figure 12:
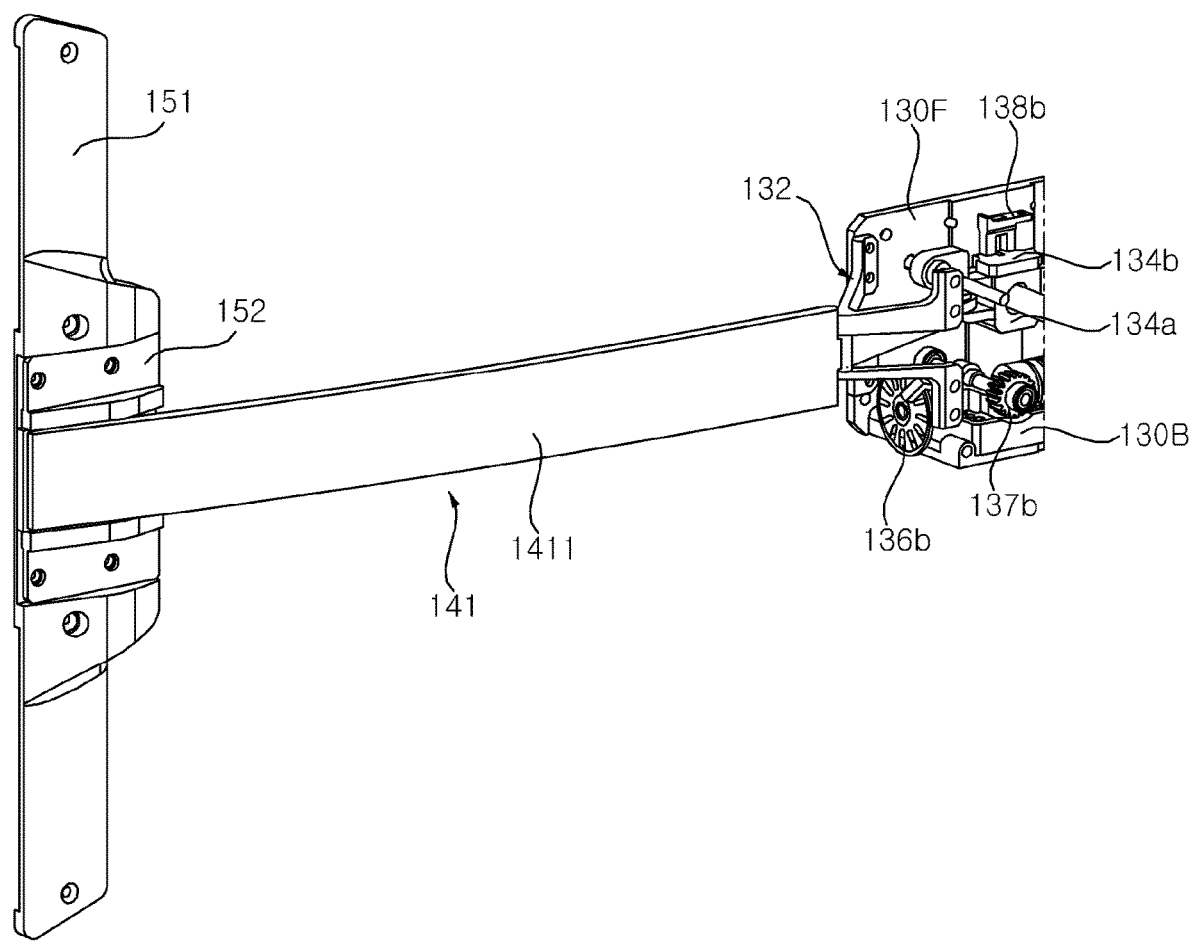
Figure 13:
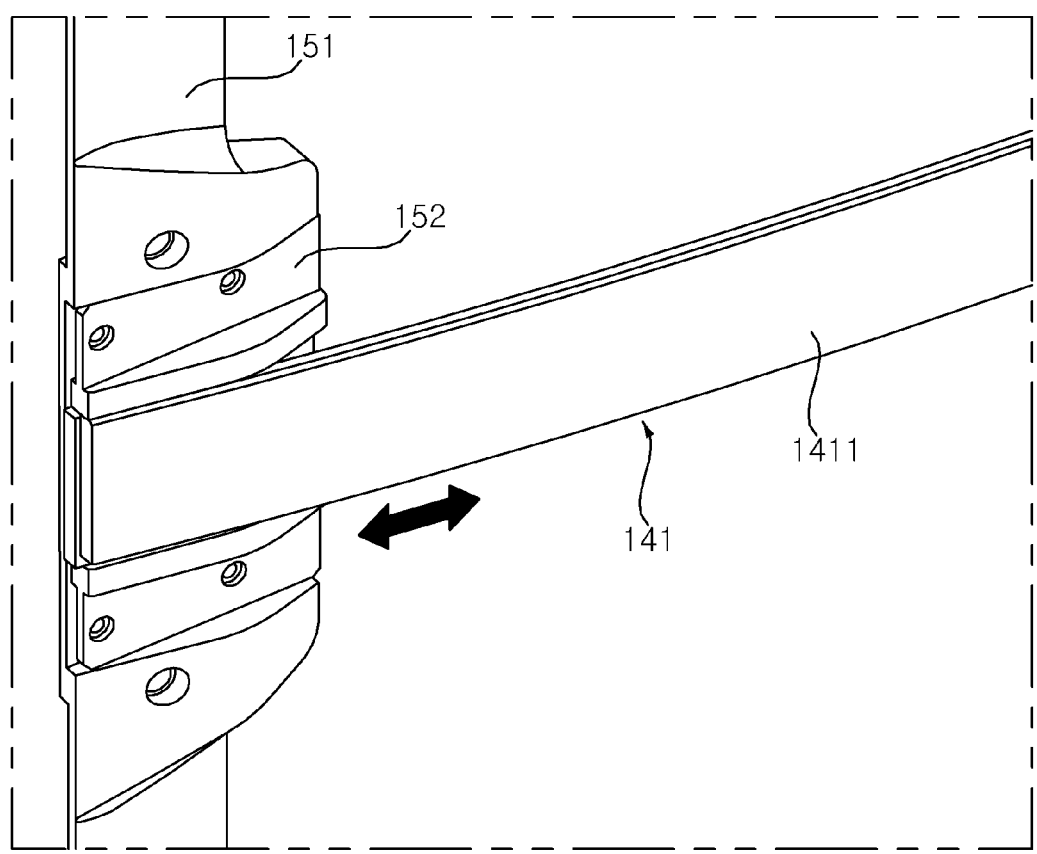
Figure 14:
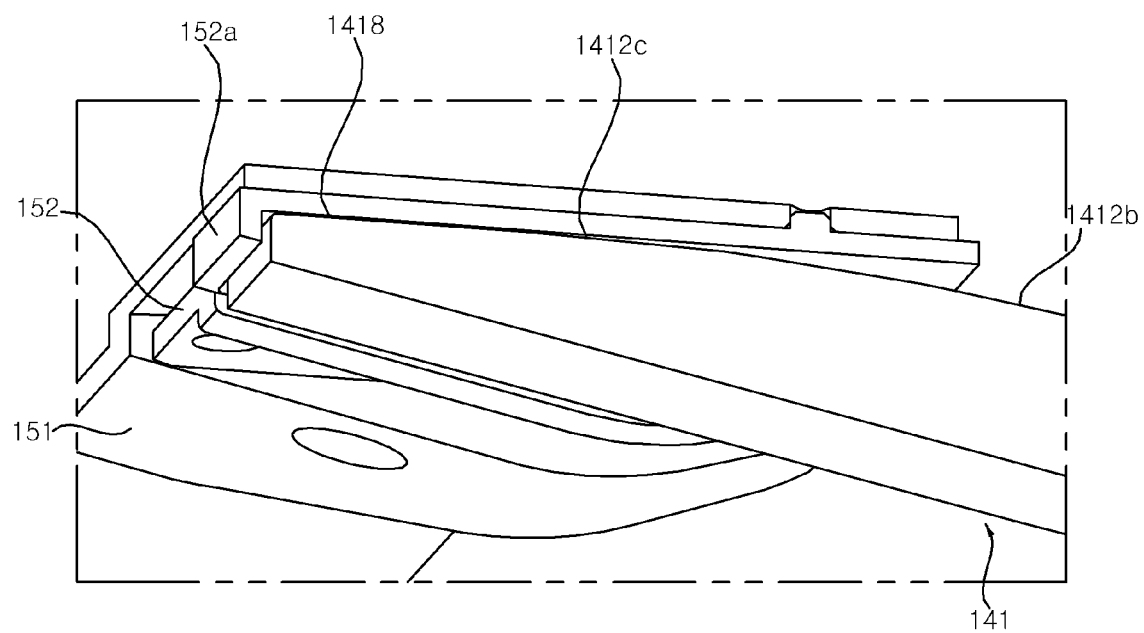

Referring to FIGS. 12 to 14, a side frame 151, 153 (refer to FIG. 2) may be coupled or fixed to the rear or rear surface of the plate 120. The side frame 151 may include a sliding mount 152. The sliding mount 152 may be mounted or fixed on the side frame 151.

The wing 141 may be coupled to the sliding mount 152 to be movable in the sliding mount 152. As the wing 141 moves on the sliding mount 152, the third rib 1412c and the wing end 1418 may contact the sliding mount 152. As the third rib 1412c and the wing end 1418 contact the sliding mount 152 with each other, the force of the wing 141 that bends the plate 120 can be effectively transmitted.

The sliding mount 152 may include a stopper 152a formed by bending the distal end. When the plate 120 is maintained to be flat, the wing end 1418 may contact the stopper 152a of the sliding mount 152. Accordingly, it is possible to prevent the front surface of the display panel 110 from being convexly curved with both ends of the plate 120 toward the rear of the display device 100.

Figure 15:
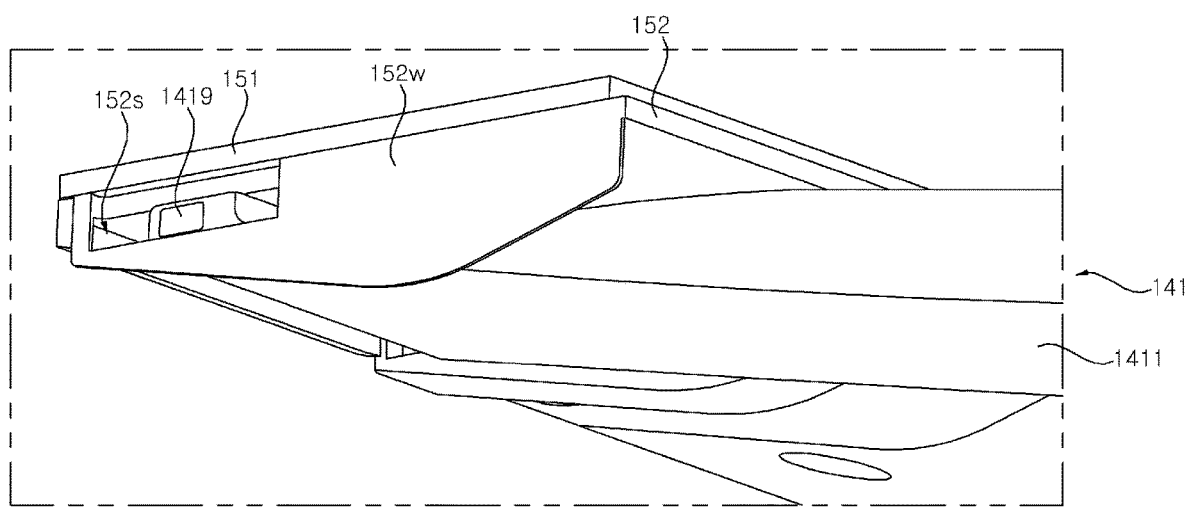
Figure 16:
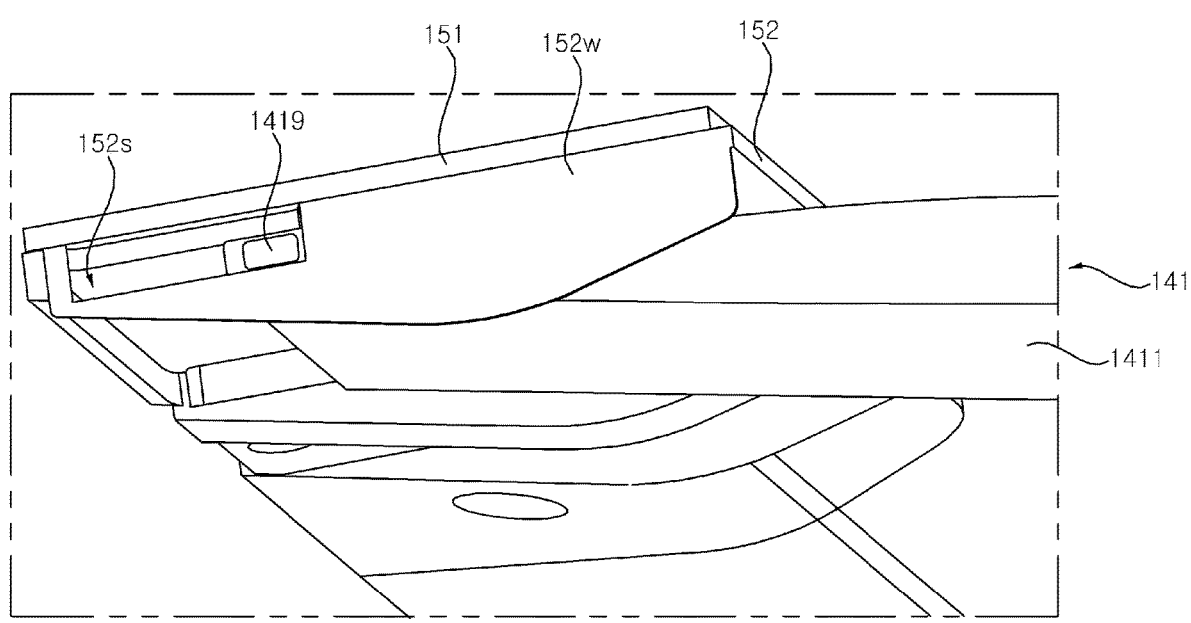

Referring to FIGS. 15 and 16, the sliding mount 152 may include a side wall 152W. The side wall 152W may face a side surface of the wing plate 1411. The wing plate 1411 may come into contact with the side wall 152W while moving on the sliding mount 152. The side wall 152W may guide the movement of the wing plate 1411.

A guide slot 152S may be formed in the sidewall 152W. The guide slot 152S may be formed to elongate through the sidewall 152W in the length direction of the wing plate 1411. For example, the guide slot 152S may be rectangular.

The end pin 1419 may be inserted into the guide slot 152S. The end pin 1419 may move in the guide slot 152S. The end pin 1419 may limit the movement of the wing plate 1411 together with the guide slot 152S. For example, the end pin 1419 may have a rectangular cross-section.

Accordingly, the force transmitted to the side frame 151 by the wing plate 1411 may be constantly maintained. In addition, as the display panel 110 and the plate 120 are curved, it is possible to improve the flattening of a region adjacent to both ends of the display panel 110 and the plate 120.

Figure 17:
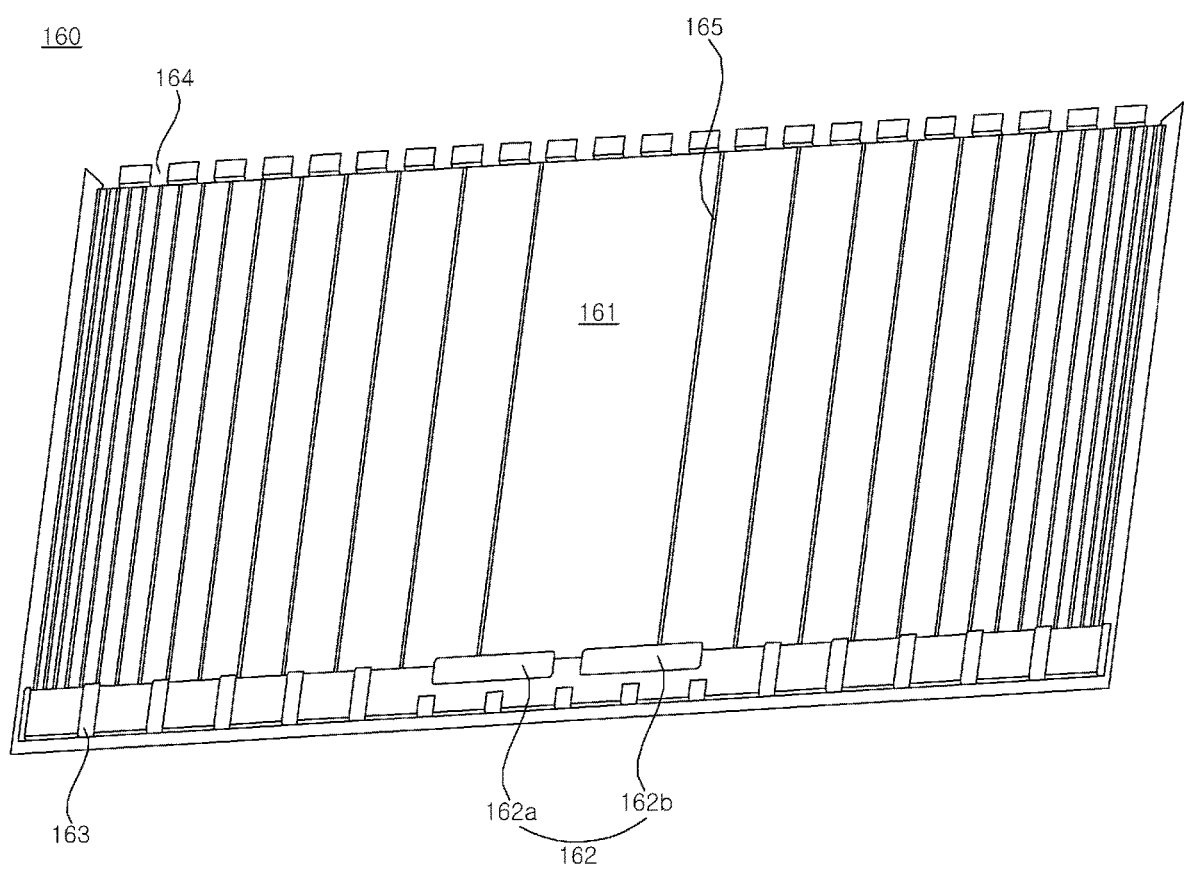
Figure 18:
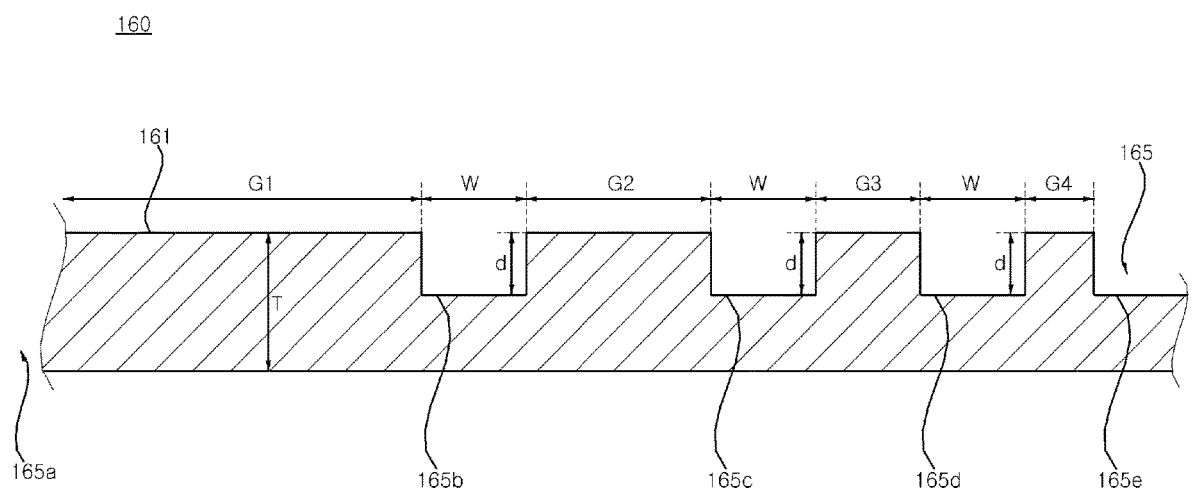

Referring to FIGS. 17 and 18, an inner plate 160 may be positioned between the display panel 110 (refer to FIG. 2) and the plate 120. A cutting line 165 may be formed on the front surface of a flat plate portion 161 of the inner plate 160. The cutting line 165 may be formed by etching the front surface of the flat plate portion 161 of the inner plate 160 in the up-down direction of the inner plate 160. For example, the thickness T of the flat plate portion 161 of the inner plate 160 may be about 1.3 to 1.7 times a depth d of the cutting line 165.

A plurality of cutting lines 165 may be formed to be elongated in the up-down direction of the inner plate 160. The plurality of cutting lines 165 may have the same width W. Each of the plurality of cutting lines 165 may be disposed at different gaps from the adjacent cutting line 165. A first gap G1 of a second cutting line 165b adjacent to a first cutting line 165a closest to the center of the inner plate 160 may be larger than a second gap G2 of a third cutting line 165c adjacent to the second cutting line 165b. A third gap G3 of a fourth cutting line 165d adjacent to the third cutting line 165c may be larger than a fourth gap G4 of a fifth cutting line 165e adjacent to the fourth cutting line 165d. The distance between the plurality of cutting lines 165 may gradually decrease from the center of the inner plate 160 toward the side. Accordingly, while the display device is curved, the degree of curvature matching may be improved. For example, the curvature may be 800R or 1000R.

A cable hole 162 may be formed in the flat plate portion 161 of the inner plate 160 by penetrating the flat plate portion 161 of the inner plate 160. The cable hole 162 may be elongated in the left-right direction. The cable hole 162 may be formed adjacent to the lower side of the inner plate 160. The plurality of cable holes 162 may be positioned adjacent to the center of the inner plate 160 and adjacent to each other.

The plurality of receiving holes 163 may be formed to penetrate the inner plate 160 along the lower side of the inner plate 160. For example, a source PCB of the display panel 110 may be accommodated and positioned in the receiving hole 163.

A cutout 164 may be formed in the upper side of the flat plate portion 161 of the inner plate 160. There may be a plurality of cut-outs 164, and the plurality of cutouts 164 may be formed while being spaced apart from each other at regular intervals along the upper side of the flat plate portion 161 of the inner plate 160.

Figure 19:
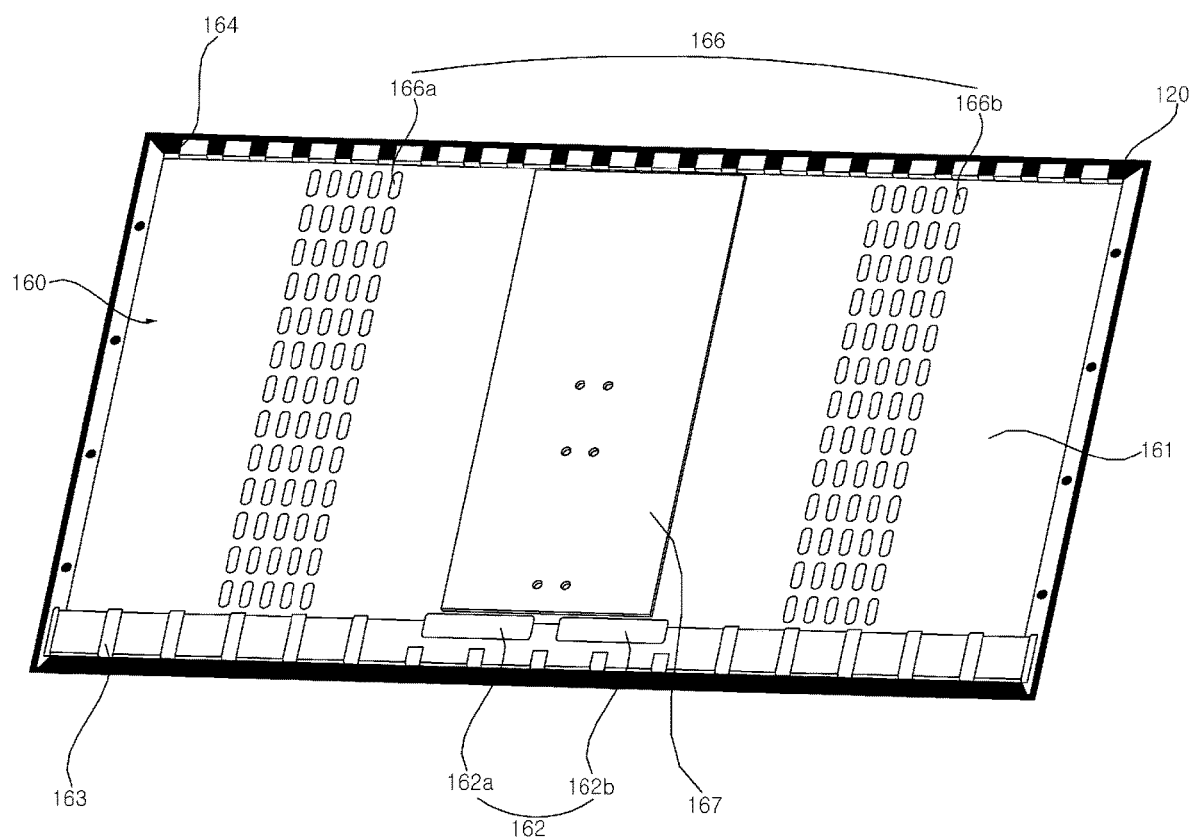

Referring to FIG. 19, the inner plate 160 may be positioned between the plate 120 and the display panel 110 (refer to FIG. 2). The inner plate 160 may be coupled to or fixed to the plate 120.

A center plate 167 may be coupled or fixed on the inner plate 160. The center plate 167 may be a plate elongated in the up-down direction. The center plate 167 may reinforce the rigidity of the inner plate 160.

The cable hole 162 may be formed in the flat plate portion 161 of the inner plate 160 by penetrating the flat plate portion 161 of the inner plate 160. The cable hole 162 may be elongated in the left-right direction. The cable hole 162 may be formed adjacent to the lower side of the inner plate 160. The plurality of cable holes 162 may be positioned adjacent to the center of the inner plate 160 and adjacent to each other.

The width of the center plate 167 may correspond to the length of the cable holes 162. A distance between both ends of the center plate 167 in the width direction may be smaller than a distance between both ends of the cable holes 162.

The plurality of receiving holes 163 may be formed to penetrate the inner plate 160 along the lower side of the inner plate 160. For example, the source PCB of the display panel 110 may be accommodated and positioned in the receiving hole 163.

A punching hole 166 may be formed in the flat plate portion 161 of the inner plate 160. There may be a plurality of punching holes 166. The plurality of punching holes 166 may include a first plurality of punching holes 166a and a second plurality of punching holes 166b. The punching hole 166 may be a long hole elongated in the up-down direction.

The first plurality of punching holes 166a may be positioned between the center plate 167 and the left side of the inner plate 160. The second plurality of punching holes 166b may be positioned between the center plate 167 and the right side of the inner plate 160. For example, the punching holes 166 may form five rows. As another example, the punching holes 166 may form thirteen rows.

The first plurality of punching holes 166a may be closer to the center plate 167 than the left side of the inner plate 160. The second plurality of punching holes 166b may be closer to the center plate 167 than to the right side of the inner plate 160.

A cut-out 164 may be formed in the upper side of the flat plate portion 161 of the inner plate 160. There may be a plurality of cutouts 164, and the plurality of cutouts 164 may be formed while being spaced apart from each other at regular intervals along the upper side of the flat plate portion 161 of the inner plate 160.

Accordingly, while the display device is curved, the degree of curvature matching may be improved. For example, the curvature may be 800R or 1000R.

Figure 20:
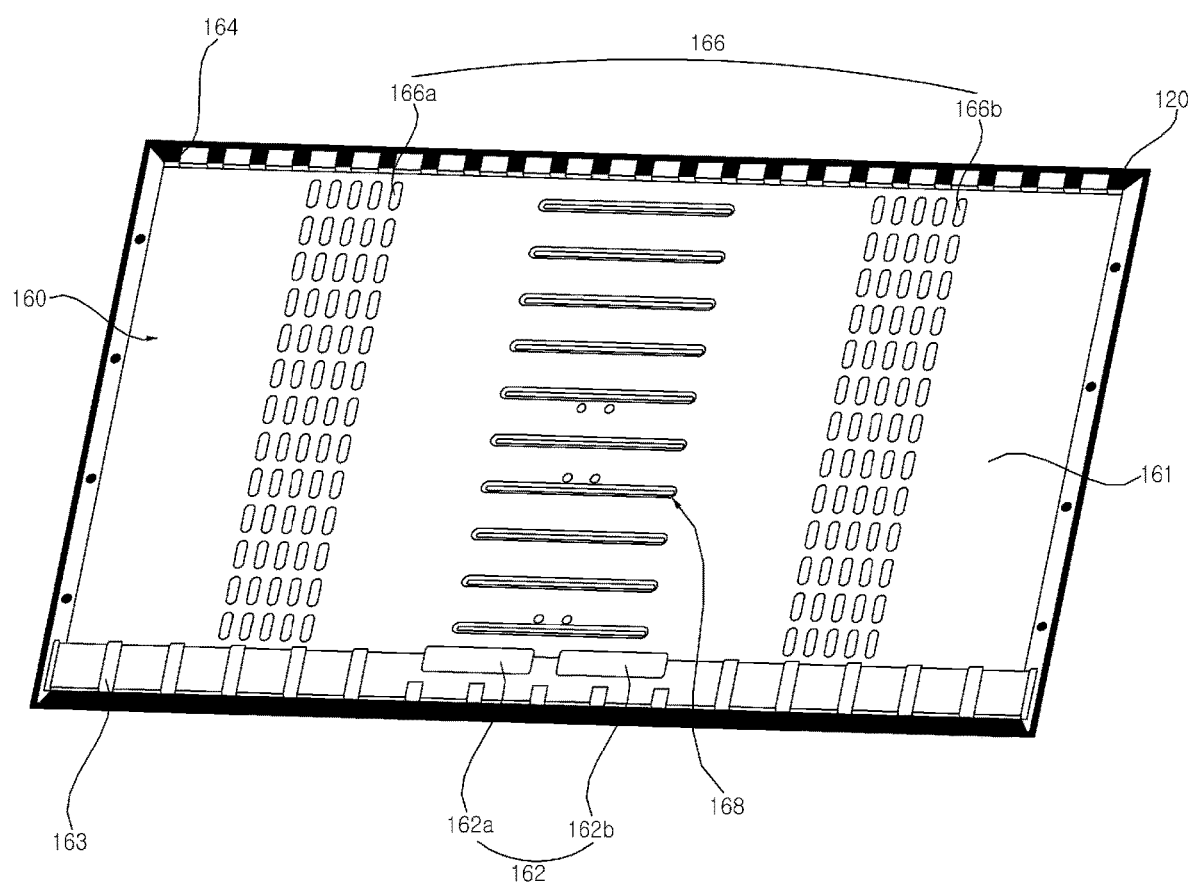
Figure 21:
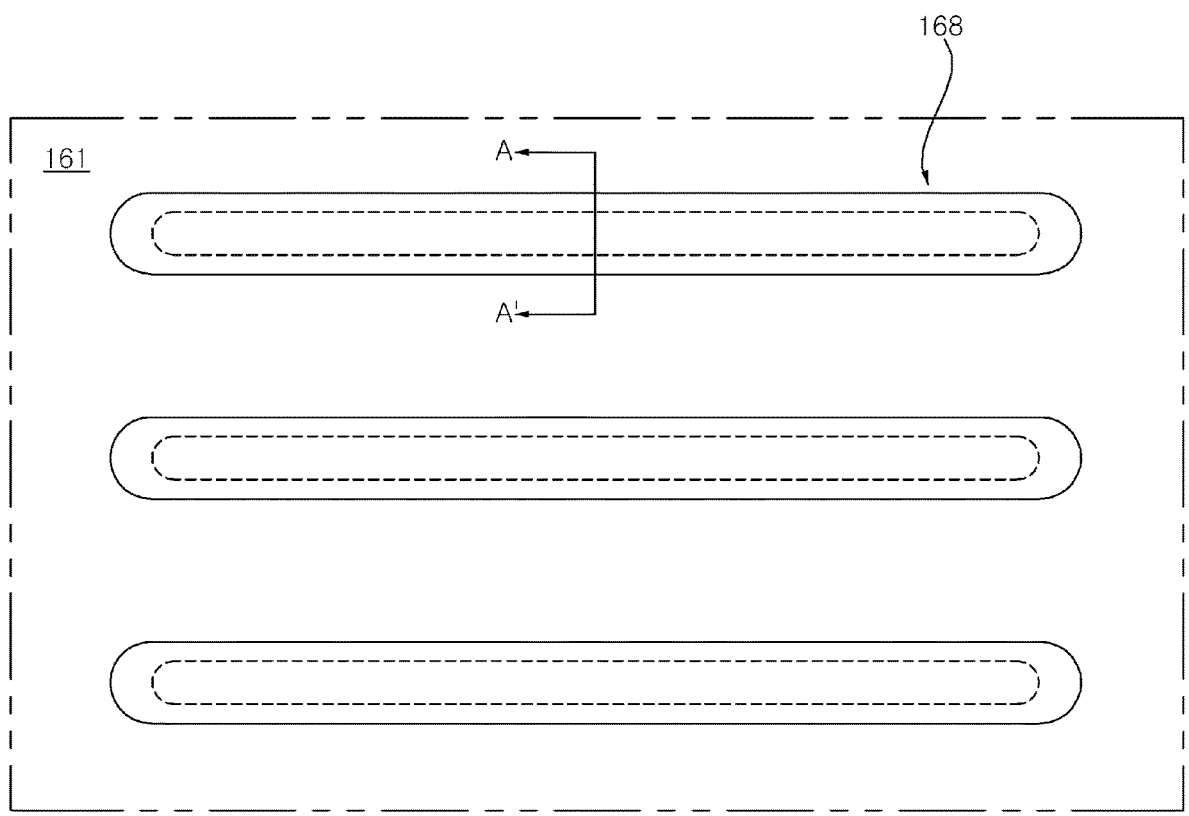
Figure 22:
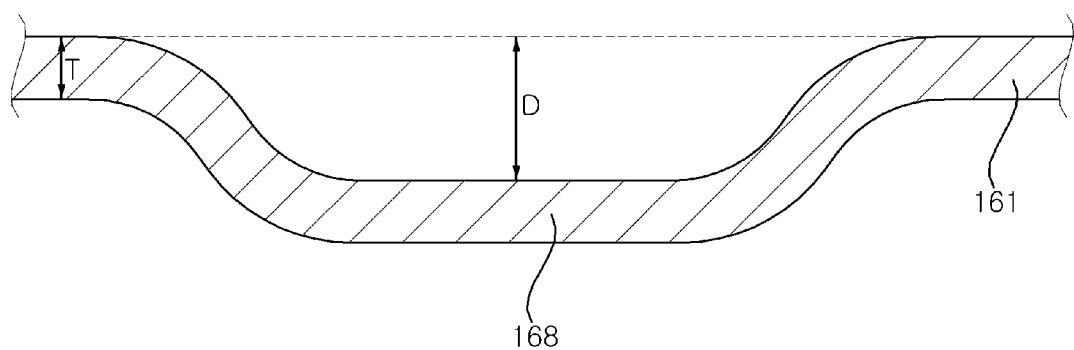

Referring to FIGS. 20 to 22, the inner plate 160 may be positioned between the plate 120 and the display panel 110 (refer to FIG. 2). The inner plate 160 may be coupled to or fixed to the plate 120.

A pressed part 168 may be elongated in the left-right direction. The pressed part 168 may be formed by being depressed while the flat plate portion 161 of the inner plate 160 is pressed. The pressed part 168 may be sequentially disposed while being spaced apart from each other in the up-down direction of the inner plate 160. The pressed part 168 may maintain the flexibility of the inner plate 160 as well as reinforce the rigidity of the inner plate 160.

The cable hole 162 may be formed in the flat plate portion 161 of the inner plate 160 by penetrating the flat plate portion 161 of the inner plate 160. The cable hole 162 may be elongated in the left-right direction. The cable hole 162 may be formed adjacent to the lower side of the inner plate 160. The plurality of cable holes 162 may be positioned adjacent to the center of the inner plate 160 and adjacent to each other.

The length of the pressed part 168 may correspond to the length of the cable holes 162. The length of the pressed part 168 may be smaller than the distance between both ends of the cable holes 162.

The plurality of receiving holes 163 may be formed to penetrate the inner plate 160 along the lower side of the inner plate 160. For example, the source PCB of the display panel 110 may be received and positioned in the receiving hole 163.

The punching hole 166 may be formed in the flat plate portion 161 of the inner plate 160. There may be a plurality of punching holes 166. The plurality of punching holes 166 may include a first plurality of punching holes 166a and a second plurality of punching holes 166b. The punching hole 166 may be a long hole elongated in the up-down direction.

The first plurality of punching holes 166a may be positioned between the pressed part 168 and the left side of the inner plate 160. The second plurality of punching holes 166b may be positioned between the pressed part 168 and the right side of the inner plate 160. For example, the punching holes 166 may form five rows. As another example, the punching holes 166 may form thirteen rows.

The first plurality of punching holes 166a may be closer to the pressed part 168 than the left side of the inner plate 160. The second plurality of punching holes 166b may be closer to the pressed part 168 than the right side of the inner plate 160.

A cut-out 164 may be formed in the upper side of the flat plate portion 161 of the inner plate 160. There may be a plurality of cutouts 164, and the plurality of cutouts 164 may be formed while being spaced apart from each other at regular intervals along the upper side of the flat plate portion 161 of the inner plate 160.

The depth D of the pressed part 168 may be 1.3 to 1.5 times the thickness of the flat plate portion 161 of the inner plate 160. The pressed part 168 may maintain the flexibility of the inner plate 160 as well as reinforce the rigidity of the inner plate 160.

Accordingly, while the display device is curved, the degree of curvature matching may be improved. For example, the curvature may be 800R or 1000R.

Referring to FIGS. 1 to 22, the display device may include: a flexible display panel 110; a flexible rear plate 120 which is positioned in a rear of the display panel 110, and coupled to the display panel 110; a flexible inner plate 160 which is coupled to the flexible rear plate 120, between the flexible rear plate 120 and the display panel 110; a driving module 130 which is coupled to a rear of the flexible rear plate 120, and provided with a slider 134a that linearly reciprocates; a wing 140 which is elongated to have one end coupled to the slider 134a and have the other end coupled to the rear of the flexible rear plate 120, and is provided with a pivot shaft PH positioned adjacent to the one end, between the one end and the other end; and a wing bracket 131, 132 which is adjacent to the pivot shaft PH to be fixed to the rear of the flexible rear plate 120, and is coupled to the pivot shaft PH, wherein the inner plate 160 which is positioned between the one end and the other end of the wing 140, and comprises a plurality of holes 166 formed by punching the inner plate 160, wherein the plurality of holes 166 is arranged in a direction intersecting with a length direction of the wing 140.

The display panel 110 may include: a left side SS1; and a right side SS2 facing the left side SS1, wherein the wing 140 includes: a first wing 143 which has one end coupled to the slider 134a and has the other end adjacent to the left side SS1 to be fixed to the rear of the flexible rear plate 120; and a second wing 141 which has one end coupled to the slider 134a and has the other end adjacent to the right side SS2 to be fixed to the rear of the flexible rear plate 120, wherein the plurality of holes 166 include: a first plurality of holes 166a positioned between the other end of the first wing 143 and the slider 134a; and a second plurality of holes 166b positioned between the other end of the second wing 141 and the slider 134a.

The first plurality of holes 166a may be symmetrical with the second plurality of holes 166b with respect to the slider 134a.

The hole may be a long hole elongated in the arrangement direction.

The inner plate 160 may further include a pressed part 168 which is positioned between the first plurality of holes 166a and the second plurality of holes 166b, and formed by pressing the inner plate 160 while elongating from the left side SS1 toward the right side SS2, wherein the pressed part 168 may include a plurality of pressed parts 168 which are spaced apart from each other in an up-down direction of the inner plate 160 and sequentially disposed.

A depth of the pressed part 168 may be 1.3 to 1.7 times a thickness of the inner plate 160.

The first plurality of holes 166a is closer to one distal end of the pressed part 168 than the left side SS1 of the inner plate 160, and the second plurality of holes 166b is closer to the other distal end of the pressed part 168 than to the right side SS2 of the inner plate 160.

The inner plate 160 may further include a center plate 167 which is positioned between the first plurality of holes 166a and the second plurality of holes 166b, and fixed to a front surface of the inner plate 160.

The inner plate 160 may further include a plurality of cutouts 164 which are spaced apart from each other along an upper side of the inner plate 160 and sequentially formed.

The inner plate 160 may further include a plurality of receiving holes 163 which are spaced apart from each other along a lower side of the inner plate 160 and sequentially formed.

The driving module 130 may include: a front bracket 130F fixed to the rear of the flexible rear plate 120; a rear bracket 130R facing the front bracket 130F; and a lead screw 133 which is elongated from the front bracket 130F toward the rear bracket 130R, and rotatably coupled to the front bracket 130F or the rear bracket 130R, wherein the slider 134a is screw-coupled to the lead screw 133 and linearly reciprocates.

The driving module 130 may further include: a first guide shaft 135a which is parallel to the lead screw 133 and fixed to the front bracket 130F or the rear bracket 130R; and a second guide shaft 135b which is parallel to the lead screw 133, is fixed to the front bracket 130F or the rear bracket 130R, and faces the first guide shaft 135a with respect to the lead screw 133.

The driving module 130 may further include a slider guide 134b into which the first guide shaft 135a and the second guide shaft 135b are inserted, and which is movable on the first guide shaft 135a and the second guide shaft 135b and is fixed to the slider 134a.

The wing bracket 131, 132 may further include: an upper bracket 131a, 132a positioned in an upper side of the wing 140; a lower bracket 131b, 132b positioned in a lower side of the wing 140; and a pin P that which connects the upper bracket 131*a*, 132*a* and the lower bracket 131*b*, 132*b*, and is inserted into a pivot shaft PH of the wing 140.

The wing 140 may include: a lever 1415, 1435 elongating from the one end to the pivot shaft PH; and a wing plate 1411, 1431 elongating from the other end to the pivot shaft PH, wherein a width of the wing plate 1411, 1431 is greater than a width of the lever 1415, 1435.

The wing 140 may further include a rib 1412, 1432 which is positioned between the flexible rear plate 120 and the wing 140, elongates from the wing plate 1411, 1431 to the lever 1415, 1435, and is formed on one surface of the wing plate 1411, 1431 and the lever 1415, 1435.

The wing 140 may further include: a wing end 1418, 1433 which is connected to the wing plate 1411, 1431 and forms the other end; and an end pin 1419, 1434 which is formed to protrude from one side surface of the wing end 1418, 1433.

The display device further include a sliding mount 152 which is positioned between the flexible rear plate 120 and the wing end 1418, is fixed to the flexible rear plate 120, and to which the wing end 1418 is coupled, wherein the sliding mount 152 may include: a side wall 152W facing one side surface of the wing end 1418; and a guide slot 152S which is formed by penetrating the sidewall 152W, and into which the end pin 1419 is inserted.

Any or other embodiments of the present disclosure described above are not mutually exclusive or distinct. Each configuration or function of any embodiments or other embodiments of the present disclosure described above may be used jointly or combined.

For example, it means that configuration A described in a specific embodiment and/or drawings may be combined with configuration B described in other embodiments and/or drawings. That is, even if the coupling between the configurations is not directly described, it means that the coupling is possible except for the case where it is described that the coupling is impossible.

The above detailed description should not be construed as restrictive in all respects and should be considered as illustrative. The scope of the present disclosure should be determined by a reasonable interpretation of the appended claims, and all modifications within the equivalent scope of the present disclosure are included in the scope of the present disclosure.

What is claimed is:

1. A display device comprising:
a flexible display panel;
a flexible rear plate at a rear of the display panel, the flexible rear plate coupled to the display panel;
a flexible inner plate between the rear plate and the display panel, the flexible inner plate coupled to the rear plate;
a driving module at a rear of the rear plate, the driving module including a slider that linearly reciprocates;
a wing elongated to have one end coupled to the slider and have the other end coupled to the rear of the rear plate, the wing including a pivot shaft adjacent to the one end, between the one end and the other end; and
a wing bracket adjacent to the pivot shaft, the wing bracket fixed to the rear of the rear plate and coupled to the pivot shaft,
wherein the inner plate comprises a plurality of holes positioned between the one end and the other end of the wing,
wherein the plurality of holes is arranged in a direction intersecting with a length direction of the wing,
wherein the display panel comprises:
a left side; and
a right side facing the left side,
wherein the wing comprises:
a first wing which has one end coupled to the slider and has the other end adjacent to the left side to be fixed to the rear of the rear plate; and
a second wing which has one end coupled to the slider and has the other end adjacent to the right side to be fixed to the rear of the rear plate,
wherein the plurality of holes comprises:
a first plurality of holes positioned between the other end of the first wing and the slider; and
a second plurality of holes positioned between the other end of the second wing and the slider,
wherein the inner plate further comprises a pressed part positioned between the first plurality of holes and the second plurality of holes, the pressed part formed at the inner plate and elongated from the left side toward the right side,
wherein the pressed part comprises a plurality of pressed parts being spaced apart from each other in the direction intersecting with the length direction of the wing of the inner plate and sequentially disposed, and
wherein the first plurality of holes is closer to one distal end of the pressed part than the left side of the inner plate, and the second plurality of holes is closer to the other distal end of the pressed part than to the right side of the inner plate.

2. The display device of claim 1, wherein the first plurality of holes is symmetrical with the second plurality of holes with respect to the slider.

3. The display device of claim 1, wherein the hole is a long hole elongated in the direction intersecting with the length direction of the wing.

4. The display device of claim 1, wherein a depth of the pressed part is 1.3 to 1.7 times a thickness of the inner plate.

5. The display device of claim 1, wherein the inner plate further comprises a center plate which is positioned between the first plurality of holes and the second plurality of holes, and fixed to a front surface of the inner plate.

6. The display device of claim 1, wherein the inner plate further comprises a plurality of cut-outs which are spaced apart from each other along an upper side of the inner plate and sequentially formed.

7. The display device of claim 6, wherein the inner plate further comprises a plurality of receiving holes which is spaced apart from each other along a lower side of the inner plate and sequentially formed.

8. The display device of claim 1, wherein the driving module comprises:
a front bracket fixed to the rear of the rear plate;
a rear bracket facing the front bracket; and
a lead screw which is elongated from the front bracket toward the rear bracket, and rotatably coupled to the front bracket or the rear bracket,
wherein the slider is screw-coupled to the lead screw and linearly reciprocates.

9. The display device of claim 8, wherein the driving module further comprises:
a first guide shaft which is parallel to the lead screw and fixed to the front bracket or the rear bracket; and
a second guide shaft which is parallel to the lead screw, is fixed to the front bracket or the rear bracket, and is opposite to the first guide shaft with respect to the lead screw.

10. The display device of claim 9, wherein the driving module further comprises a slider guide into which the first guide shaft and the second guide shaft are inserted, and which is movable on the first guide shaft and the second guide shaft and is fixed to the slider.

11. The display device of claim 1, wherein the wing bracket further comprises:
- an upper bracket positioned at an upper side of the wing;
- a lower bracket positioned at a lower side of the wing; and
- a pin connecting the upper bracket and the lower bracket, and inserted into a pivot shaft of the wing.

12. The display device of claim 1, wherein the wing comprises:
- a lever elongating from the one end to the pivot shaft; and
- a wing plate elongating from the other end to the pivot shaft,
- wherein a width of the wing plate is greater than a width of the lever.

13. The display device of claim 12, wherein the wing further comprises a rib which is positioned between the rear plate and the wing, elongates from the wing plate to the lever, and is formed on one surface of the wing plate and the lever.

14. The display device of claim 13, wherein the wing further comprises:
- a wing end which is connected to the wing plate and forms the other end; and
- an end pin which is formed to protrude from one side surface of the wing end.

15. The display device of claim 14, further comprising a sliding mount which is positioned between the rear plate and the wing end, is fixed to the rear plate, and to which the wing end is coupled,
- wherein the sliding mount comprises:
- a side wall facing one side surface of the wing end; and
- a guide slot which is formed by penetrating the side wall, and into which the end pin is inserted.

* * * * *